3,050,520
PROCESS OF PREPARING 2-OLEFINIC IMIDAZOLES

William E. Erner, Wilmington, Del., and Harold A. Green, Elkins Park, Pa., assignors to Air Products and Chemicals, Inc., a corporation of Delaware
No Drawing. Filed Mar. 31, 1960, Ser. No. 18,798
3 Claims. (Cl. 260—240)

This invention relates to 2-olefinic imidazoles and to a method of preparing this class of compounds.

The compound 2-methylimidazole has previously been studied, and there have been literature reports that the hydrogens of the methyl group on the number 2 carbon of imidazole do not readily react. As explained at page 278 of the textbook "Imidazoles and Their Derivatives" by Hoffmann, previous workers have been unsuccessful in attempts to react 2-methylimidazole with RCHO, that is, an aldehyde in which R is a hydrocarbon group.

In accordance with the method of the present invention, a compound of the 2-olefinic imidazole class is prepared by a method comprising the condensation of an aldehyde with an imidazole having at the 2 position a substituent providing a methylene group. For example, methyl, ethyl, octyl, benzyl or the furfuryl group could provide the necessary methylene group.

The nature of the invention may be further clarified by reference to a plurality of examples.

Example I

A 500 milliliter, three-necked flask was equipped with a stirrer, funnel for slowly adding a liquid reactant, and a tube for withdrawing distillate. A Dean-Stark trap was employed in recycling to the reaction mixture any benzaldehyde distilled from the reaction mixture during the initial stages of the reaction. The flask contained 82 g. (1 mol) of 2-methylimidazole and about 2.4 g. of piperidine (approximately equal to 3% by weight of the 2-methylimidazole) as catalyst for the condensation reaction. Benzaldehyde was allowed to drip slowly into the heated reaction mixture and the by-product water was distilled from the reaction. All of the benzaldehyde was added during a period of about 30 minutes and a temperature of 200° C. was maintained for an additional 2 hours. The reaction product was allowed to cool and extracted with about 320 milliliters of an aqueous solution containing 10% hydrochloric acid. The acidic solution was subjected to steam distillation to remove residual traces of benzaldehyde. Filtration of the liquid permitted the recovery of 71 g. of a crude grade of 2-styrylimidazole and a large amount of a dark brown filtrate.

The crude 2-styrylimidazole was dissolved in aqueous ethanol and entrained hydrogen chloride was removed by addition of concentrated ammonium hydroxide. The alkaline alcoholic solution was poured into a larger quantity of distilled water, from which a purified grade of 2-styrylimidazole was separated by filtration. The thus purified base was dissolved in a small quantity of 10% hydrochloric acid and evaporated under vacuum to provide 2-styrylimidazole hydrochloride dihydrate, having an empirical formula $C_{11}H_{15}N_2O_2Cl$. Analysis of the material confirmed the compound to be 2-styrylimidazole hydrochloride dihydrate.

| Element | Calculated | Found |
|---|---|---|
| C | 54.7 | 55.2 |
| H | 6.2 | 6.0 |
| N | 11.5 | 11.7 |
| Cl | 14.7 | 14.2 |
| O | 13.2 | 12.9 |

The hydrochloride-dihydrate was dissolved in an aqueous alkaline (NaOH) solution and the liberated base separated by filtration. The base was dissolved in isopropanol and then reprecipitated by adding the isopropanol solution with stirring to a four fold volume of cold water. The thus purified 2-styrylimidazole was recovered by drying under reduced pressure.

A solution of 2-styrylimidazole in a mixture of isopropanol, potassium hydroxide and water was impregnated into a test fabric. The dried material was subjected to tests for usefulness as an optical brightener and it was established that the fluorescence had a highly desirable bluish shade more advantageous than the pinkish shade of some optical brighteners.

A solution of 2-styrylimidazole in a nitrocellulose lacquer is employed in preparing a lacquered panel subjected to an accelerated light aging test, and the effectiveness of 2-styrylimidazole as an absorption agent for ultra-violet light is established. A solution of the 2-styrylimidazole in a lubricaing oil serves to chelate metal ions and to enhance the surface active characteristics of the lubricating oil.

Example II

Benzaldehyde was added dropwise into a stirred, heated (about 160° C., well below the 180° C. boiling point of benzaldehyde) mixture of 164 g. (2 mols) 2-methylimidazole and 5 g. of piperidine catalyst until 212 g. (2 mols) had been added. The reaction mixture was heated at 200° C. for 2 hours while distilling water from the system. The crude product was dissolved in isopropanol and the alcoholic solution was steam-distilled to provide a residue which was dissolved in isopropanol. Activated charcoal was suspended in and then filtered from this isopropanol solution to remove polymeric by-products and the thus clarified solution was poured into water to precipitate 2-styrylimidazole. This precipitate was dried under vacuum to provide crystals of 2-styrylimidazole, the elemental analysis confirming the purity and structure of the compound.

The condensation of benzaldehyde with 2-methylimidazole should be conducted at an elevated temperature within the range from 80° C. to 220° C., preferably about 200° C. It is desirable to minimize the concentration of water in the reaction system, as can conveniently be accomplished by distilling water from the reaction mixture. A base which does not react with benzaldehyde, such as pyridine, piperidine, quinoline or the like should be present to catalyze the condensation.

Such catalyst should constitute at least 0.5 but generally not more than about 5% by weight of the reaction mixture, the catalytic amounts of amine being about the same for this reaction as for other condensation reactions involving aldehydes. The isolation of the 2-styrylimidazole from the crude condensation product may utilize any appropriate combination of purification steps, and such combination may include dissolution in an alcoholic solvent and subsequent precipitation from an aqueous system.

Example III

Anisaldehyde was condensed with 2-methylimidazole to form the compound

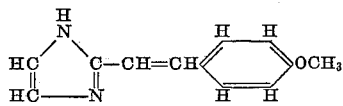

which was purified by dissolving the crude product in alcohol and subsequently precipitating the compound from a predominantly aqueous solvent. The compound is useful as an absorption agent for ultra violet light, increasing the durability of clear nitrocellulose lacquer films subjected to prolonged sunlight.

Example IV

Salicylaldehyde was condensed with 2-methylimidazole to form the compound

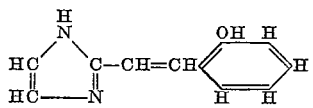

which was purified by dissolving the crude product in alcohol and subsequently precipitating the compound from a predominantly aqueous solvent. The compound is useful for absorption of ultra violet light and increases the sunlight resistance of polypropylene plastic containing a minor amount thereof.

Example V

A condensation reaction occurred when m-nitrobenzaldehyde was added dropwise into a stirred, heated mixture of 2-methylimidazole and quinoline, and the water by-product was distilled away from the mixture. After purification of the crude product by dissolving in hot alcohol, clarifying with charcoal, and precipitation from a cooled aqueous solution, the compound

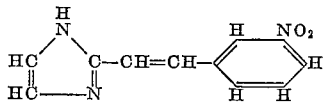

was isolated and shown to be useful as an agent for absorbing ultra-violet light.

Example VI

The compound

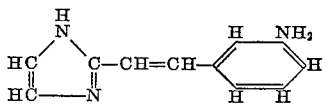

was prepared from the previously described corresponding nitro compound, by a reduction with a mild reducing agent, specifically with zinc dust in acetic acid. The compound is shown to be useful as an agent for absorbing ultra-violet light.

Example VII

Phenyl acetic acid and ethylene diamine are reacted to prepare 2-benzylimidazole, which is condensed with benzaldehyde to form alpha (2-imidazolyl) stilbene

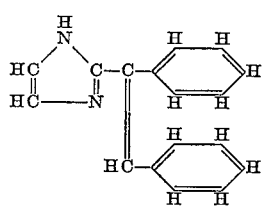

which compound is effective as an agent for absorbing ultra-violet light.

Example VIII

Water was distilled from a reaction mixture of 2-methylimidazole and cinnamaldehyde to prepare 2-(4-phenyl-1,3-butadienyl) imidazole

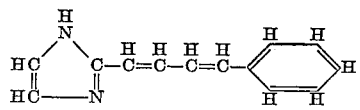

which compound was effective in absorbing ultra-violet light when incorporated in a minor amount in a sunlight sensitive plastic.

In a series of tests, as shown in the above examples, it is established that the reaction should be conducted between an aldehyde having fewer than ten carbon atoms and an imidazole having fewer than fourteen carbon atoms and that the equation can be expressed as:

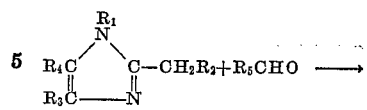

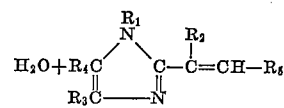

These previous results are recapitulated in tabular form as follows:

| Example | $R_1$ | $R_2$ | $R_3$ | $R_4$ | $R_5$ |
|---|---|---|---|---|---|
| I | H | H | H | H | $C_6H_5$. |
| II | H | H | H | H | $C_6H_5$. |
| III | H | H | H | H | $C_6H_4OCH_3$ (para). |
| IV | H | H | H | H | $C_6H_4OH$ (ortho). |
| V | H | H | H | H | $C_6H_4NO_2$ (meta). |
| VI | H | H | H | H | $C_6H_4NO_2$ (reduced to $NH_2$). |
| VII | H | $C_6H_5$ | H | H | $C_6H_5$. |
| VIII | H | H | H | H | $CH=CH-C_6H_5$. |

Other compounds of this class prepared according to the above generic formula are tabulated and offered as examples:

Examples IX–XV

| Example | $R_1$ | $R_2$ | $R_3$ | $R_4$ | $R_5$ |
|---|---|---|---|---|---|
| IX | H | H | $C_6H_5$ | $CH_3$ | $C_6H_5$. |
| X | H | H | $C_2H_5$ | $C_6H_5$ | $C_6H_5$. |
| XI | H | H | $CH_3$ | $CH_3$ | $C_6H_5$. |
| XII | H | H | $C_2H_5$ | H | $CH_3$. |
| XIII | H | H | $C_3H_7$ | H | $C_5H_{11}$ |
| XIV | $CH_3$ | H | H | H | $C_6H_5$. |
| XV | H | $CH_3$ | H | $C_2H_5$ | $C_6H_3-(CH_3)_2$. | all of said compounds being useful as ultra-violet light absorbers. Thus it is established that each of $R_1$, $R_2$, $R_3$ and $R_4$ is selected from the class of organo-groups and hydrogen; and that $R_5$ is an organic group having less than 9 carbon atoms.

Example XVI

Three detergent-brightener compositions were prepared as follows:

| | Parts by weight | | |
|---|---|---|---|
| 2-styrylimidazole | 1 | 1 | 1 |
| detergent (calgonite) | 2,000 | 2,000 | 20,000 |
| bleach (NaOCl) | 0 | 200 | 0 |
| Code for composition | A | C | C |

Three aqueous solutions are prepared, each containing 0.5% of detergent-brightener (bleach) in water to make the detergent-brightener bath at 80° C. (176° F.). Cotton, linen and rayon swatches were immersed and agitated for five minutes in each detergent-brightener bath. Swatches were then dried at room temperature and kept in a dark cabinet. When exposed to ultra-violet light in a dark room each of the alkenyl imidazoles showed blue fluorescence when only 1 part of brightener was used per 20,000 parts of detergent as well as when a high concentration of bleach was present.

Example XVII

The alkenyl imidazoles of this invention are effective stabilizers for alkylene polymers such as polyethylene and polypropylene, or halogen containing polymers, such as polymers or copolymers containing vinylidene chloride. In such use, the alkenyl imidazoles are effective in amounts of from 0.5% to about 3%, preferably in the 1–2% range based on the polyolefinic component.

Two sample compositions were prepared with 98 parts by weight of a copolymer composed of 85% vinylidene chloride and 15% of vinyl chloride together with (a) 2 parts of 2-styrylimidazole and (b) no styrylimidazole. Both samples were equally irradiated under ultra-violet light for 120 hours and examined thereafter for discoloration. The sample containing no styrylimidazole was dark brown; however, the sample containing 2% of styrylimidazole and developed only a slightly yellow color.

*Example XVIII*

Difficulty has been experienced in attempts to dye hydrocarbon fibers, such as polyethylene or polypropylene. Because of their inert nature (their lack of functional groups) these polymeric materials do not couple or become bound to substantive dyes. However, when a polyunsaturated cyclic diazine, such as styrylimidazole is introduced into the polymer by copolymerizing it with ethylene and/or styrene and/or propylene under appropriate conditions of polymer formation, e.g. in the presence of titanium tetrachloride and aluminum alkyls as catalysts, the introduction of even as little as 1 part per thousand of styrylimidazole produces a copolymer which is dyed easily to give clean, stable colored fibers.

A mixture was prepared consisting of 99.5 parts of liquid propylene polymer containing 5 parts per thousand of Ziegler catalyst and 0.5 part of 2-styrylimidazole. Another mixture was the same except for the substitution of 2-p-amino-styrylimidazole. Each mixture was heated to melt the copolymer. Dispersion of 0.1% of xylene Blue VS into the melted copolymer provided a mixture which was heated at 150° F. for 2 hours, thus producing a solid plastic of stable clear blue color. In this regard the sample containing 2-p-amino-styrylimidazole gave a brighter colored polymer than styrylimidazole itself. In the process of surface dyeing of polyethylene and polypropylene fibers, the ratio of 2-alkenyl imidazole in the composition is preferably higher. Copolymers containing 1 to 5% of 2-styrylimidazole were found to be fast to basic dyes and also to acid dyes, such as Acid Anthracene Red G.

*Example XIX*

The compound 1,4-di(2-imidazolyl) butadiene was prepared by condensation of glyoxal with 2-methylimidazole, and the compound was useful not only as an agent for absorbing ultra-violet light but also as a copolymer in olefinic polymers.

Obviously many modifications and variations of the invention as hereinbefore set forth may be made without departing from the spirit and scope thereof, and therefore only such limitations should be imposed as are indicated in the appended claims.

What is claimed is:
1. The method of preparing 2-olefinic imidazole which includes the steps of: heating

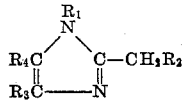

in which each of $R_1$, $R_2$, $R_3$, and $R_4$ is selected from the group consisting of hydrogen and lower alkyl, with an approximately equimolar quantity of an aldehyde selected from the group consisting of lower alkanals, glyoxal, cinnamaldehyde, benzaldehyde, methyl-substituted benzaldehyde, monohydroxy-substituted benzaldehyde, monomethoxy-substituted benzaldehyde and mono nitro-substituted benzaldehyde in the presence of catalytic amounts of a strongly basic amine containing only carbon, nitrogen and hydrogen atoms, to form water and 2-olefinic imidazole; and distilling water from the reaction mixture.

2. The method of preparing 2-olefinic imidazole which includes the steps of: heating

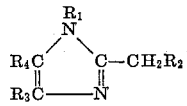

in which each of $R_1$, $R_2$, $R_3$, and $R_4$ is selected from the group consisting of hydrogen and lower alkyl, with an approximately equimolar quantity of an aldehyde selected from the group consisting of lower alkanals, glyoxal, cinnamaldehyde, benzaldehyde, methyl-substituted benzaldehyde, monohydroxy-substituted benzaldehyde, monomethoxy-substituted benzaldehyde and mono nitro-substituted benzaldehyde, in the presence of catalytic amounts of a strongly basic amine containing only carbon, nitrogen and hydrogen atoms, to form water and 2-olefinic imidazole; distilling water from the reaction mixture; and purifying the 2-olefinic imidazole by dissolution in an alcoholic solvent and precipitation of 2-olefinic imidazole from an aqueous system.

3. The method of preparing 2-olefinic imidazole compounds which includes the steps of: heating an aldehyde selected from the group consisting of lower alkanals, glyoxal, cinnamaldehyde, benzaldehyde, methyl-substituted benzaldehyde, monohydroxy-substituted benzaldehyde, monomethoxy-substituted benzaldehyde and mono nitro-substituted benzaldehyde with 2-methylimidazole in the presence of catalytic amounts of a strongly basic amine containing only carbon, nitrogen and hydrogen at a temperature above 100° C. to distill water and to form said 2-olefinic imidazole; and purifying said 2-olefinic imidazole by dissolution in an alcoholic solvent and precipitation of 2-olefinic imidazole from an aqueous system.

References Cited in the file of this patent
FOREIGN PATENTS
248,885    Germany _____ July 6, 1912
OTHER REFERENCES
Wright: Chem. Reviews, vol. 48, page 500 (1951).
Elderfield: Heterocyclic Compounds, vol. 5, page 519 (1957).

UNITED STATES PATENT OFFICE
CERTIFICATE OF CORRECTION

Patent No. 3,050,520                      August 21, 1962

William E. Erner et al.

It is hereby certified that error appears in the above numbered patent requiring correction and that the said Letters Patent should read as corrected below.

Column 3, line 10, for "componnd" read -- compound --; column 4, in the table for "Examples IX-XV, sixth column, line 1 thereof, for "C6H5" read -- $C_6H_5$ --; same column 4, in the table for Example XVI, third column, line 4 thereof, for "C" read -- B --; column 5, line 6, for "and" read -- had --.

Signed and sealed this 21st day of May 1963.

(SEAL)
Attest:

ERNEST W. SWIDER
Attesting Officer

DAVID L. LADD
Commissioner of Patents